Figure 3:
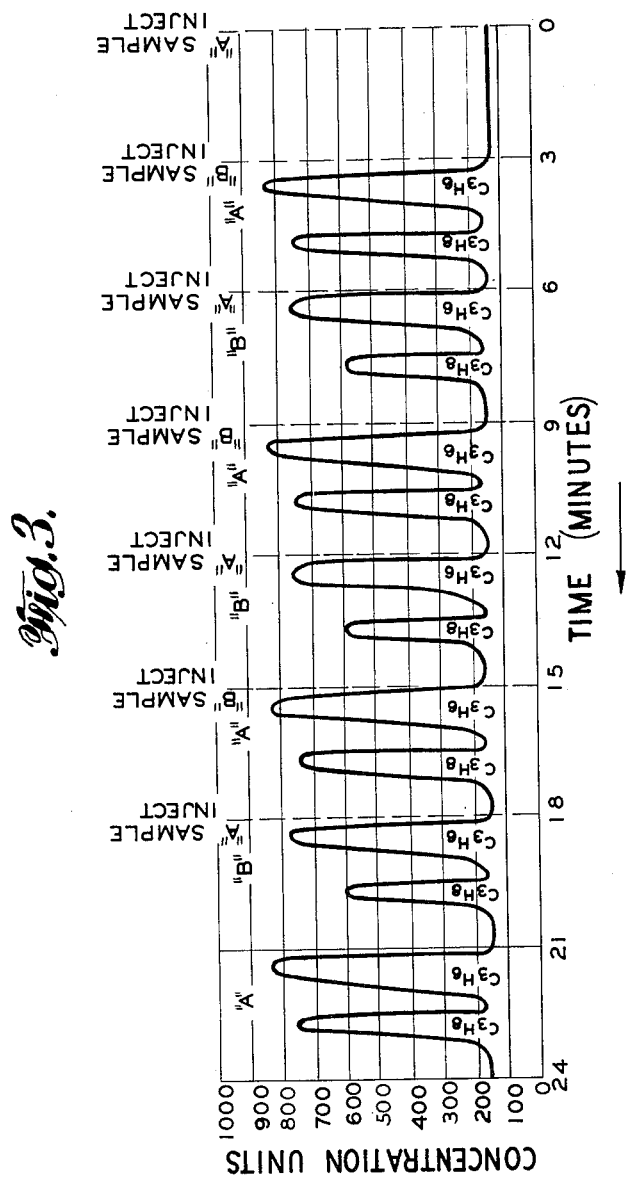

May 3, 1966     R. D. WEBB     3,248,929
OPERATING METHOD FOR VAPOR FRACTION ANALYZERS
Filed Aug. 27, 1962     2 Sheets-Sheet 1
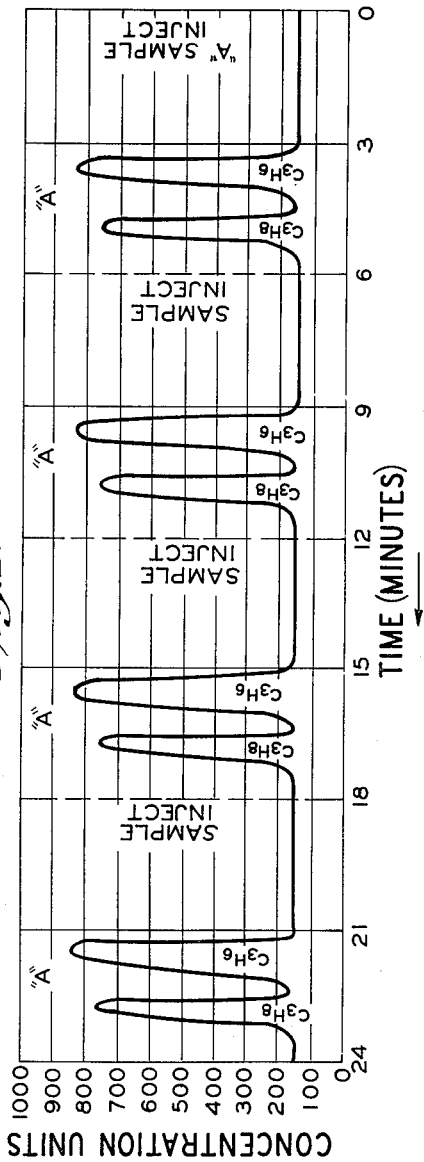
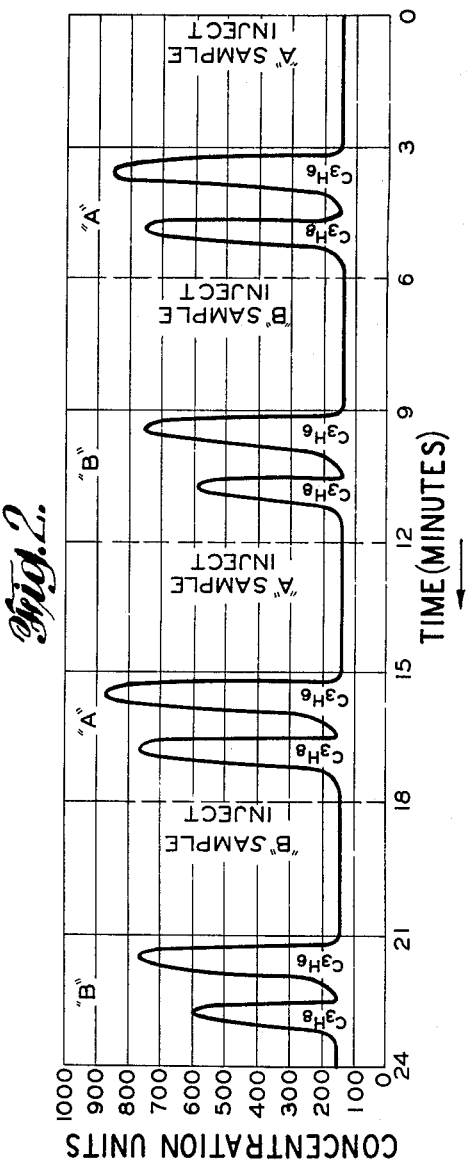
INVENTOR.
RALPH D. WEBB
BY Maurice W. Ryan
ATTORNEY May 3, 1966 R. D. WEBB 3,248,929
OPERATING METHOD FOR VAPOR FRACTION ANALYZERS
Filed Aug. 27, 1962 2 Sheets-Sheet 2

INVENTOR.
RALPH D. WEBB
BY
Maurice W. Ryan
ATTORNEY

United States Patent Office 3,248,929
Patented May 3, 1966

3,248,929
OPERATING METHOD FOR VAPOR
FRACTION ANALYZERS
Ralph D. Webb, Charleston, W. Va., assignor to Union
Carbide Corporation, a corporation of New York
Filed Aug. 27, 1962, Ser. No. 219,620
6 Claims. (Cl. 73—23.1)

The present invention relates to vapor fraction analyses, also known as gas chromatography, and more particularly to a novel method of chromatographic analysis which permits of more effective and efficient use of known analyzer equipment. The invention provides a method whereby a given vapor fraction analyzer can be operated to obtain a greater number of discrete analyses of a series of continual analyses in a given period of time. The resultant higher frequency of analyses makes for more exact monitoring and control over a fluid stream or streams in which the analyzer is connected.

In a typical vapor fraction analysis system, multicomponent fluid samples are successively introduced into a stream of carrier gas, for example helium, and flushed through an analyzer tube or column which is packed with inert particles which have been coated with a low vapor-pressure liquid such as a silicone. Each component vapor in the sample volume has a different adsorption affinity for the column packing material. The component of the sample with the lowest adsorption coefficient will be eluted from the analyzer column first and the component with the highest adsorption coefficient for the packing material will be eluted last. This results in the effective separation of the various components of the multicomponent sample and the components issue from the column in bands, each in binary mixture with the continuously flowing carrier gas. Detection and quantitative measurement of each of the components of interest of the sample is accomplished by including one thermally sensitive electrical element in the carrier gas stream to provide a standard or reference measurement and another similar thermoelectric element in the stream of binary mixtures issuing from the column to provide for measurement of these. The thermal elements are arranged to form two arms of an electrical bridge circuit, the output signals of which are a measure of the difference between the thermal conductivity properties of the reference and binary mixture streams and which are interpreted as percent by volume concentrations of components of interest in the multicomponent stream. Variations in the impedance of the thermal element in the binary mixture stream are caused by thermal conductivity variations occurring as between the successive bands of the binary mixtures eluted from the chromatographic column. Since the thermal element in the reference carrier gas stream is at all times surrounded only by carrier gas alone, the variations in the measuring element effect bridge unbalances which are read by any suitable detector means, such as a recording potentiometer.

The analysis of process fluids by the use of chromatographic analyzers is one of the fastest growing and most successful analytical procedures made available to industry in recent times. It has found particularly effective application in the chemical manufacturing industry, where the ability of the chromatographic analyzer to give accurate analyses of fluid stream components has been well proved and widely acknowledged. Until fairly recently, however, the chromatographic analyzer was in large measure relegated to the laboratory where it was employed primarily for spot sample analysis. In order for the full potential of this analytical technique to be realized, it was necessary to modify and improve it for utilization on plant process streams. Many of the problems encountered in adapting chromatographic analysis to plant process stream use as an automatic repetitive process technique have been solved, but many others remain.

One of the substantial problems encountered in the adaptation of the chromatographic analyzer to plant process stream use has been that of the time delay between discrete analyses inherent in all analyzers. In known operating techniques, when one multicomponent sample has been completely resolved, eluted, detected and vented out of the analyzer, another is introduced into the column for the next analysis. Usually many minutes are required for a chromatographic analyzer to completely analyze a multicomponent fluid sample and before the next subsequent sample can be introduced into the column. Efforts to overcome this time delay problem have included reducing the retentivity of the column packing materials. This approach to the problem imposes the obvious limitation that the attainment of a desirable low column retention time may involve the loss of resolution capability with resultant lowered sensitivity and accuracy, tendency to drift both in peak amplitude and in time of elution and reductions in usable column life.

It is therefore the primary object of the present invention to provide a method whereby analyzer running time is used most effectively and thus materially reduce the above-described time lag without requiring any detrimental changes in column design or usage.

It is a further object of the present invention to provide an improved method of chromatographic analyses for plant process streams comprehending an accelerated frequency of sampling and analysis whereby more effective stream monitoring and more precise stream parameter control is afforded users of known analyzers.

In general, the method of my invention comprises introducing successive multicomponent fluid samples from a given stream or streams into a chromatographic column at an accelerated frequency based upon a time interval selected so that an immediately previously injected sample from the same stream or another similarly constituted stream is about to start undergoing elution and analysis. In other words, a second sample is introduced into the resolving column before an immediately preceding first sample has fully eluted from the column, so that two samples are in the column at different stages of resolution and/or elution at the same time. More specifically, the method of my invention comprises the steps of injecting a first multicomponent fluid sample volume into a resolving column of a chromatographic analyzer, resolving said first multicomponent fluid sample volume into discrete components while maintaining a continuous flow of a carrier gas through said column, injecting a second multicomponent fluid sample volume into said resolving column at a time before all of the discrete components of interest of the first sample volume are eluted from the column and eluting the discrete components of the first sample volume each in binary mixture with said carrier gas while concurrently resolving said second sample volume into discrete components.

The time selected for the injection of the second sample volume must be such as to prevent interference of the lighter or faster eluting components of the second sample volume with any component of interest in the first sample volume and interference of the heavier or slower eluting components of the first sample volume with components of interest of the second sample volume. The second sample volume may be either from the same multicomponent fluid source or stream as the first or from another. Injections made to produce analyses subsequent to the first and second may be taken as samples successively from any number of streams or sources up to $n$, where $n$ is the total number of streams successively analyzed with a single analyzer. Practical considerations such as analyzer response time and the minimum acceptable readout frequency will of course effectively impose limitations on the total number of streams $n$ which can be analyzed with a single arrangement.

With the foregoing and other features in view, which shall hereinafter more fully appear, the invention will now be described in greater particularity and with reference to the drawings, wherein:

FIGURE 1 represents a strip chart recording of four discrete analyses of a single gas stream performed by a conventional chromatographic analyzer according to known operating methods;

FIGURE 2 represents a strip chart recording of two discrete analyses each of two somewhat similarly constituted gas streams performed by a conventional chromatographic analyzer according to known operating methods and FIGURE 3 represents a strip chart recording of four discrete analyses each of two somewhat similarly constituted gas stream performed by a conventional chromatographic analyzer operated according to the method of the present invention.

Referring to the drawings, FIGURE 1 shows a strip chart recording of four discrete analyses of a propane-propylene gas stream A performed according to known operating techniques by a conventional chromatographic analyzer. Starting at time zero, a sample volume from the stream is injected into the analyzer column. After the elapse of three minutes, during which time the first injected sample is resolved in the column, propylene, in binary mixture with the carrier gas, elutes from the column and is detected and indicated by the analyzer as the $C_3H_6$ peak. As can be seen in the drawing, the propylene peak occurs in a time span of about one and one half minutes and is followed closely in time by the elution, detection and indication of the propane component in binary mixture with the carrier gas indicated as the $C_3H_8$ peak. After the elapse of slightly less than six minutes, the propane peak is complete. At the elapse of six minutes a second sample volume may be injected into the column in accordance with conventional operating techniques and the above described sequence will be repeated. From this it can be readily seen that twenty four minutes will be required to complete the four analyses shown, with four distinct periods of zero reading (scale adjusted) occurring, scil. from zero to three minutes, six to nine minutes, twelve to fifteen minutes and eighteen to twenty one minutes, one each between any given sample injection and the start of its emergence from the column for detection and indication. Persons familiar with the art will appreciate that this recurrent time lapse of approximately three minutes will, in a particular analyzer apparatus, remain the same for successive analyses of a propylene-propane stream but may of course differ for streams otherwise constituted.

FIGURE 2 shows a strip chart recording of two discrete analyses each of two different propane-propylene gas streams A and B performed according to known operating techniques by the same conventional chromatographic analyzer. The sequence of the analyses is the same as described above except that alternate injections are made from each of the two streams.

From FIGURES 1 and 2 and the above discussion it can be seen that a conventional analyzer operated according to known techniques when applied to the monitoring and control of a single stream A will furnish one analysis every six minutes. In the case of monitoring and controlling two streams A and B, an analysis for each of the streams will be obtained one every twelve minutes. Extrapolation of these facts shows that in the situation where it is desired to monitor and control three streams, known operating techniques will produce one analysis per stream per eighteen minutes and so on up to $n$ streams where one analyses per stream per $6n$ minutes will be produced by this particular analyser. The frequency of analyses, then, for any one gas stream, decreases with the number of streams having substantially the same composition being analyzed. Where several streams are being analyzed, the sequential analysis indications for any one stream can be too infrequent to permit proper control of the process being monitored. In fact, with some low inertia processes having relatively rapid response characteristics, monitoring of only a single stream according to known methods may furnish indicia too infrequently to permit of effective control of the monitored process.

With this being the state of the art, the present invention was conceived, having as an object the desideratum of increasing the frequency of analyses in chromatographic analyzers.

Referring to FIGURE 3 of the drawings, there is shown a strip chart recording of four discrete analyses each of two different propane-propylene gas streams A and B performed according to the method of my invention by the same conventional chromatographic analyzer used in the analyses shown in FIGURES 1 and 2. Starting at time zero, a sample volume from stream A is injected into the analyzer column. The sample is swept on into the column by the carrier gas and is resolved in an elapsed time of about three minutes, at which time it begins to elute and produce an indication first of propylene in binary mixture with the carrier gas. At the end of the third minute, a sample volume from stream B is injected into the analyzer column. During the time interval from three to six minutes, both the elution and detection of the stream A sample and the resolution of the stream B sample are in progress. At the end of the sixth minute, another sample volume from stream A is injected into the column. During the time interval from six to nine minutes, both the elution and detection of the stream B first sample and the resolution of the second sample from stream A occur. At the expiration of twenty four minutes, the time required to produce either four analyses of a single gas stream or two analyses each of two gas streams according to conventional operating methods, the method according to the present invention will have produced twice the hitherto obtainable number of analyses scil. i.e., four discrete analyses each of the two gas streams A and B. The effect of analyzer operation according to the method of my invention is thus seen to be a succession of readouts wherein indicia of the component concentrations of one stream, A, occur during the same time interval as the resolution of a sample from another stream, B and indicia of the component concentrations of the first sample from the B stream occur during the same time interval as the resolution of a second sample from the A stream. The time cycle for the readout indications of each of the two streams A and B when using the method of the invention is six minutes, as shown in FIGURE 3, whereas it is twelve minutes when analyzing according to conventional operation, as shown in the two-stream chart reproduction of FIGURE 2 of the drawings.

While in the above description and the related FIGURE 3 of the drawings, a two stream arrangement is discussed, it will be apparent that the invention is as readily adaptable to single stream or multi-stream (more than 2) operation. Single stream monitoring and control in low inertia processes having relatively rapid response characteristics may be enhanced and made more effective by acceleration of the analyses frequency in accordance with the present invention. The invention is similarly adaptable to the monitoring and control of a multiplicity of streams, the exact number depending upon the process inertia and stability exhibited after a change in a controlling parameter.

Although the foregoing descriptions and the drawings relate examples of the invention where the time interval between sample injections is one half of what the interval would be without the invention, the increase in sampling frequency might be from slightly over one to perhaps eight or ten times the frequency otherwise possible. The increased frequency of sampling is dependent upon the nature of the gas being sampled, the particular components of interest and the operating characteristics of the analyzer used.

The method of the present invention is also readily applicable to dual column chromatographic analyzers wherein a first column is used to separate heavy ends from a multicomponent sample and the light ends of the sample pass through the first column into a second column where they are resolved. While the resolution of the light ends of a given sample is in progress in the second column, the first column may be connected for fast-flushing or back-flushing with an increased carrier gas flow to remove the unwanted heavier fractions. This results in the first column being ready to receive the next sample injection at a time before elution of the first sample light ends from the second column is complete and, in some cases, while resolution of the first sample light ends is still in progress. Under such conditions, the time saving technique of the present invention may be advantageously applied and a second sample injected into the first column, its lighter fractions therein separated from the heavier fractions and passed into the second column before all of the discrete components of interest of the first sample are eluted from the second column. Here again it is necessary that the time of the second sample injection be chosen so as to preclude the possibility of overlap of the components of interest in the second column.

In some applications of chromatographic analysis according to either duel column or single column technique, certain heavy fractions present in the multicomponent samples may occur in only small or trace quantities and these may be permitted to reside in a resolving column for longer than one cycle. In such instances, the various parameter of the analyzer are chosen and combined to effect discernable or measurable indication on the readout apparatus only for those components of interest. In other cases, a single discernable indication or peak on the analyzer readout apparatus may represent more than one distinct or discrete component of the original sample resolved as, for example, where the analyzer may produce a single indication representing the elution of air or may be adapted to simultaneously elute a general mixture of the $C_4$ hydrocarbons including butadiene, isobutane, normal butane, etc. Such an elution then, wherein a group of truly discrete components issues from the column as a single grouped band, is considered, within the meaning of this disclosure, as a component of interest in the analysis.

From the foregoing descriptions it can be appreciated that my invention provides a significant contribution to the analytical art, specifically adding to the art of chromatographic analysis a method for increasing the number of analyses, in a given time period, of component concentrations in a fluid stream or streams, using a given chromatographic analyzer. The method in general comprehends injecting successive samples into the column of a chromatographic analyzer and allowing only enough time to elapse between successive injections to prevent sorption-desorption of components of interest overlapping within the column. In this manner two or more samples are at different stages of sorption and/or desorption within the column at one time, and a small time interval than heretofore attainable exists between the elution of successive groups of sample components and their resulting concentration indicia. Thus more frequent analyses and hence improvement in control can be maintained for the gas stream or streams being monitored by the analyzer. This increased frequency of operation also permits more streams to be analyzed in a given length of time.

The foregoing description is given only for clearness of understanding of the present invention and no unwarranted limitations should be understood therefrom.

What is claimed is:

1. A method of chromatographic analysis comprising the steps of injecting a first multicomponent fluid sample volume into a resolving column of a chromatographic analyzer, resolving said first multicomponent fluid sample volume into discernable components of interest while maintaining a continuous flow of a carrier gas through said column, injecting a second multicomponent fluid sample volume into said resolving column at a time before all of the discernable components of interest of the first sample volume are eluted from the column, and eluting the discernable components of interest of the first sample volume each in binary mixture with said carrier gas while concurrently resolving said second sample volume into discernable components of interest.

2. A method of chromatographic analysis comprising the steps of injecting a first sample volume from a multicomponent fluid source into a resolving column of a chromatographic analyzer, resolving said first sample volume into discernable components of interest while maintaining a continuous flow of a carrier gas through said column, injecting a second sample volume from said multicomponent fluid source into said resolving column at a time before all of the discernable components of interest of the first sample volume are eluted from the column, and eluting the discernable components of interest of the first sample volume each in binary mixture with said carrier gas while concurrently resolving said second sample volume into discernable components of interest.

3. A method of chromatographic analysis of at least two multicomponent fluid sources comprising the steps of injecting a first sample volume from a first multicomponent fluid source into a resolving column of a chromatographic analyzer, resolving said first sample volume into discernable first components of interest while maintaining a continuous flow of a carrier gas through said column, injecting a second sample volume from a second multicomponent fluid source into said resolving column at a time before all of the discernable components of interest of the first sample volume are eluted from the column, and eluting the discernable components of interest of the first sample volume each in binary mixture with the carrier gas while concurrently resolving said second sample volume into discernable second components of interest.

4. A method of chromatographic analysis comprising the steps of injecting a first multicomponent fluid sample volume into a resolving column of a chromatographic analyzer, resolving said first multicomponent fluid sample volume into discernable components of interest while maintaining a continuous flow of a carrier gas through said column, injecting a second multicomponent fluid sample volume inot said resolving column at a time before all of the discernable components of interest of the first sample volume are eluted from the column and after said discernable components of interest of the first sample volume are at least partially resolved, and eluting the discernable components of interest of the first sample volume each in binary mixture with said carrier gas while concurrently resolving said second sample volume into discernable components of interest.

5. A method of chromatographic analysis comprising the steps of injecting a first sample volume from a multicomponent fluid source into a resolving column of a chromatographic analyzer, resolving said first sample volume into discernable components of interest while maintaining a continuous flow of a carrier gas through said column, injecting a second sample volume from said multicomponent fluid source into said resolving column at a time before all of the discernable components of interest of the first sample volume are eluted from the column and after said discernable components of interest of the first sample volume are at least partially resolved, and eluting the discernable components of interest of the first sample volume each in binary mixture with said carrier gas while concurrently resolving said second sample volume into discernable components of interest.

6. A method of chromatographic analysis of at least two multicomponent fluid sources comprising the steps of injecting a first sample volume from a first multicomponent fluid source into a resolving column of a chromatographic analyzer, resolving said first sample volume into discernable first components of interest while maintaining a continuous flow of a carrier gas through said column, injecting a second sample volume from a second multicomponent fluid source into said resolving column at a time before all of the discernable components of interest of the first sample volume are eluted from the column and after said discernable components of interest of the first sample volume are at least partially resolved, and eluting the discernable components of interest of the first sample volume each in binary mixture with the carrier gas while concurrently resolving said second sample volume into discernable second components of interest.

References Cited by the Examiner
UNITED STATES PATENTS 3,068,685  12/1962  Rogers _____ 73—23

FOREIGN PATENTS 1,121,591  1/1962  Germany.

DAVID SCHONBERG, *Primary Examiner.*

JOSEPH P. STRIZAK, RICHARD C. QUEISSER,
*Examiners.*

S. CLEMENT SWISHER, *Assistant Examiner.*